INVENTOR.
WILLIAM A. GREINER, JR.

United States Patent Office 3,156,129
Patented Nov. 10, 1964

3,156,129
BELT ALIGNING DEVICE
William A. Greiner, Jr., Lancaster Township, Lancaster County, Pa., assignor to Armstrong Cork Company, Lancaster, Pa., a corporation of Pennsylvania
Filed June 5, 1962, Ser. No. 200,284
3 Claims. (Cl. 74—241)

This invention relates to a belt aligning device and more particularly to an aligning device for inelastic belts such as the continuous steel belts or bands on industrial machines used in the production of plastic sheet material.

In the manufacture of thermoplastic sheet materials such as resilient floor and wall coverings, it has been found that the decorative surface of the material can be substantially improved if it is calendered onto a smooth steel belt and allowed to remain in contact with the surface of the belt for a period of time. The surface characteristics of the sheet material resulting from contact with the belt are superior to the conventional decorative surface on sheet materials of this type.

Due to the fact that such belts are usually of a substantial width and length, they are subjected to considerable dimensional change caused by temperature variations from side to side and from end to end of the belt. In a typical installation utilized in the production of vinyl tile the steel belt is approximately 42" wide and 150' long. To this steel belt a sheet of thermoplastic material is adhered during a calendering operation. The thermoplastic material is at a temperature of about 275° F. at the time it is calendered onto the belt. This temperature is substantially reduced during the path of travel of the sheet on the belt.

In conventional equipment of this type the one calender roll over which the belt travels is mounted on a shaft journalled in fixed bearings while the guide roll rotates about a shaft rotating in bearings mounted in horizontally movable chocks. With this arrangement it is possible to maintain a constant tension on the belt as the belt expands and contracts. This is accomplished by means of hydraulic cylinders connected to the slidable chocks so the chocks can be moved by the cylinders to place a constant tension on the belt. As the belt contracts it pushes the chocks against the pressure in the cylinders.

This arrangement, while taking care of the lengthwise deviation in the size of the belt, does not correct for changes which take place from side to side of the belt caused by temperature differentials across the belt, making the belt longer on one side than on the other. When this condition occurs the belt is tight along the short edge and loose along the other edge resulting in a movement of the belt in a direction parallel to the axis of the guide roll over which the belt is passing.

To correct for this condition in which the belt is longer on one side than on the other, the device of this invention has been developed. The central position for the path of travel of the belt passing between the calender roll and the guide roll is determined by a scanning device of the type shown in pending patent application Serial No. 89,820, filed February 16, 1961, in the name of Charles F. Schneider. This scanning device comprises basically an air nozzle in the form of an elongated slot. This nozzle is positioned so as to direct a jet of air in a direction perpendicular to the path of travel of the belt and the elongated dimension of the nozzle is also perpendicular to the path of travel of the belt. Positioned on the side of the sheet opposite the nozzle, in close proximity thereto, and in alignment therewith, there is a receiver for the air passing from the nozzle. When the belt is in its center position, the one edge of the belt will shield one half of the air passing from the nozzle toward the receiver. As the belt moves across the guide roll in one direction it will shield more than one half the air and as it moves in the other direction it will shield less than one half of the air.

An object of this invention is to provide a device which will permit movement of a belt guide roll to insure constant tension on an inelastic belt throughout its width regardless of the dimensional changes arising from temperature differentials, etc., resulting in a centered belt on the guide roll at all times.

Another object of this invention is to provide a resilient cushion against which the chock moves to maintain proper tension on the guiding roll and also on the belt.

In order that this invention may be more readily understood, it will be described in connection with the attached drawing in which.

Figure 1:
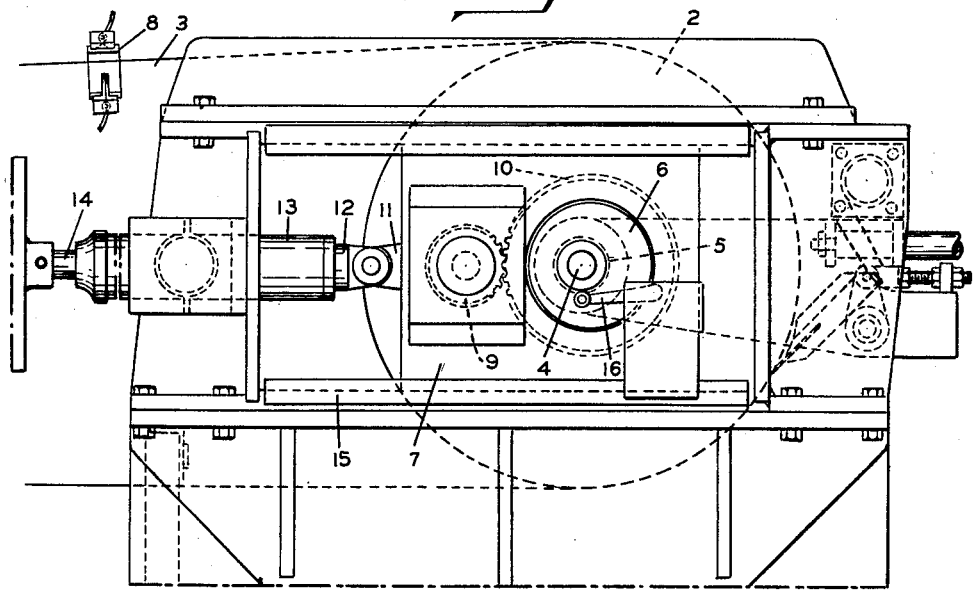
FIG. 1 is a side elevational view showing the bearing mounting of the roll.

Referring to the drawing, there is shown a guide roll 2 having a steel or other inelastic belt 3 passing thereover. The roll 2 is mounted on a center shaft 4 which passes through bearings 5. The bearings 5 are mounted in an eccentric mounting 6 which is rotatable through a limited arc in its mounting in the bearing chock 7. The belt 3 passes through a sensing device 8. The signal from this sensing device is fed to a device controlling a rotary actuator which rotates a gear 9. This gear 9 meshes with a gear 10 on the periphery of the eccentric mounting 6 for the bearing 5 in the chock 7. The chock 7 has a projection 11 on the face thereof which is conected by means of the link 12 to the cap end of a hydraulic cylinder 13, the ram 14 of which is attached to a fixed support. The shaft on which the calender roll rotates is in a fixed position in the same fixed support to which the ram 14 is attached. The chock 7 moves in ways 15 which are also in this same fixed support frame. With this arrangement, when the eccentric mounting 6 rotates to move the axis of the guide roll through an arc, the forward thrust exerted by the movement of the chock 7 is taken up by the hydraulic cylinder 13.

Figure 2:
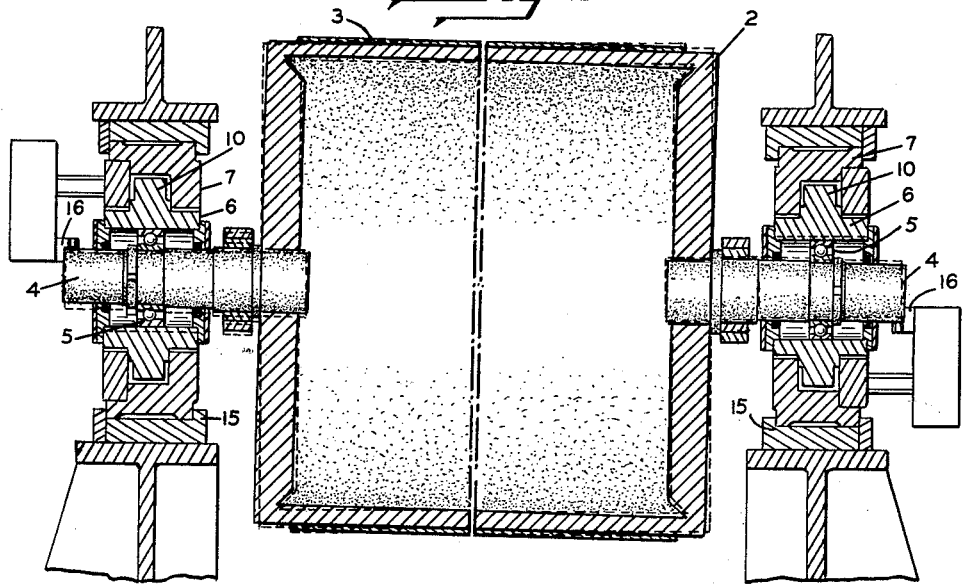
FIG. 2 is a cross-sectional view showing the guide roll mounting arrangement.

In the operation of the device, a suitable alignment scanning device 8 is placed in the path of travel of the steel belt 3. This scanner 8 is so positioned that when the belt is in its central or normal position, the signal being sent to the hydraulic control system indicates that no correction is necessary and there is no flow of oil to either of the rotary actuators which operate the gears 9. The rotary actuators used here are those sold by Ex-Cell-O Corporation of Greenville, Ohio, under the trademark Rotac. This is a hydraulic motor which is capable of rotating through a 270° arc. The hydraulic fluid is forced into the cylinder, and the vein in the cylinder rotates a distance proportional to the quantity of fluid fed thereto. The quantity of fluid is determined by the scanner 8 which indicates when the belt is off to one side. The amount of fluid fed to the motor is sufficient to rotate the eccentric to change the position of the roll to move the belt toward the center of the roll. This hydraulic unit is a standard piece of equipment and forms no part of the invention here under consideration. Any deviation in belt travel is picked up by the scanner and a signal is sent to the hydraulic control system. This in turn allows oil to flow to the rotary actuators causing rotation of gears 9. The direction and degree of rotation of the actuators and their gears 9 is dependent on the strength of the signal from the scanning device 8. The gear 9 rotates the gear 10 mounted on the periphery of the eccentric mounting 6 and moves the center of the shaft 4 up or down depending on the strength of the signal from the scanner. Inasmuch as the eccentric 6 moves the center of the shaft 4 about an arc, it has a tendency to increase the distance between the axis of the calender roll and the center of the shaft 4 of the guide roll. This, of course, is impossible because the belt 3 cannot be increased in length. As a result, rotary movement of the eccentric 6 moves the shaft 4 in a vertical direction only. This means that the center of the eccentric mounted in the chock 7 must move toward the calender roll. This carries with it the chock 7 in which the eccentric 6 is mounted and the movement of the chock is against the hydraulic cushion in the cylinder 13 mounted on the fixed support carrying the calender roll. In the embodiment here under consideration, the rotary actuators move the gears 9 through a maximum arc of 270°. The ratio of the gears 9 to the gears 10 is such that the maximum movement of the gears 9 will move gears 10 through 90° (45° on each side of the center position of shaft 4). The extent of movement of the guide roll 2 is illustrated in FIG. 2 where the roll in solid lines is in its center position and the broken lines show its maximum tilted position.

The eccentric arrangement is the same on both shaft mountings and the arrangement is such that when one eccentric moves to elevate the shaft the other eccentric alternates by lowering the shaft the same amount. This tends to move the belt from side to side as is required. A valve positioner 16 is mounted on both chocks and as it is actuated it transmits a signal to the mechanism on the opposite side to insure that the gears 9 and 10 on the opposite side are rotated exactly the same amount in the opposite direction.

Any movement of the eccentric 6 on either side will immediately move the valve positioner 16. As the valve positioner 16 moves on one side a signal is sent to the hydraulic control circuit. When the positioner on the opposite side has moved the same amount and the signal from this positioner is sent to the hydraulic circuit, and when compared with the first they are equal, flow of oil in the hydraulic circuit ceases and the system will remain stationary until another signal is received from the sensing device. From the above discussion it can be seen that the amount of lowering of the roll shaft on one side determines and is equal to the amount of raising on the other. This assumes that rotation of the drum occurs about its central axis.

With an arrangement of this type, the various parts of the mechanism function to tilt the roll the desired degree to keep the belt in proper alignment. The amount of movement is relatively slight inasmuch as the belt being inelastic does not creep on the roll to the extent that a conventional elastic belt creeps.

It will be obvious from the foregoing that I have perfected a device in which an elastic steel belt can be made to keep a true course on a roll or drum.

I claim:

1. An aligning device for controlling the path of travel of an inelastic belt, comprising a guiding member over which the belt travels, a supporting frame in which said guiding member is supported, a pair of slidable chocks in which said guiding member is journaled for movement in said support, a pair of eccentric mountings mounted in said chocks for the ends of the shaft passing through the center of said guiding member, a scanning device to determine the alignment of the belt with respect to the guiding member, means for rotating said eccentrics in accordance with a signal from said scanning device, and a hydraulic cushion in direct alignment with the movement of the chock to cushion said movement.

2. An aligning device for controlling the path of travel of an inelastic belt, comprising a guiding member over which the belt travels, a supporting frame in which said guiding member is supported, a slidable chock in which said guiding member is journaled for movement in said support, an eccentric mounting mounted in said chock for the end of the shaft passing through the center of said guiding member, a scanning device to determine the alignment of the belt with respect to the guiding member, means for rotating said eccentric in accordance with a signal from said scanning device, and a hydraulic cushion in direct alignment with the movement of the chock to cushion such movement.

3. An aligning device for controlling the path of travel of an inelastic belt, comprising a guiding member over which the belt travels, a supporting frame in which said guiding member is supported, a pair of slidable chocks in which said guiding member is journaled for movement in said support, a pair of eccentric mountings mounted in said chocks for the ends of the shaft passing through the center of said guiding member, a scanning device to determine the alignment of the belt with respect to the guiding member, means for rotating one eccentric in one direction and the other eccentric in the opposite direction in accordance with the signal from said scanning device, and a hydraulic cushion in direct alignment with the movement of the chock to cushion said movement.

References Cited in the file of this patent

UNITED STATES PATENTS

| | | |
|---|---|---|
| 1,152,439 | Sargent et al. | Sept. 7, 1915 |
| 2,488,294 | Hornbostel | Nov. 15, 1949 |
| 2,491,636 | Ames | Dec. 20, 1949 |